March 14, 1961 F. C. TASHER 2,974,447
FRONT ROLL DRIVE FOR WINDOW GLASS DRAWING APPARATUS
Filed April 24, 1958 5 Sheets-Sheet 1

INVENTOR.
FRED C. TASHER
BY Oscar L. Spencer
ATTORNEY

INVENTOR.
FRED C. TASHER
BY
Oscar L. Spencer
ATTORNEY

March 14, 1961 F. C. TASHER 2,974,447
FRONT ROLL DRIVE FOR WINDOW GLASS DRAWING APPARATUS
Filed April 24, 1958 5 Sheets-Sheet 5

INVENTOR.
FRED C. TASHER
BY
ATTORNEY

United States Patent Office 2,974,447
Patented Mar. 14, 1961

2,974,447

FRONT ROLL DRIVE FOR WINDOW GLASS DRAWING APPARATUS

Fred C. Tasher, Henryetta, Okla., assignor to Pittsburgh Plate Glass Company, Allegheny County, Pa., a corporation of Pennsylvania Filed Apr. 24, 1958, Ser. No. 730,699

3 Claims. (Cl. 49—17)

This invention relates to sheet glass drawing machines, such as those employed in the Pennvernon and Fourcault processes involving the use of a series of rolls in a vertical casing which grip the glass sheet between the members of each pair and provide the traction necessary for drawing the glass continuously from a bath of molten glass in a forehearth. The rolls on one side of the sheet are ordinarily mounted in fixed bearings, while the rolls on the other side are carried in movable bearings pressed inwardly by weighted levers, the latter, usually known as swing rolls, provide yielding pressure between the members of each pair of rolls. The manner in mounting the rolls, that is, one fixed and one movable, allows the passages of extreme differences in thickness of glass, such as caused when the drawing process is started or by improper operation in the drawing of the glass. Thus the glass may be drawn and removed without breakage and avoids the resultant problem involved in removing the broken glass from the glass machine.

Some difficulty has been experienced in providing a drawing machine drive where the same speed of rotation of all fixed and movable rolls is maintainable for the life of the drawing machine. One such previous attempt was the use of a chain drive between each pair of rolls; however, as the pinions over which the chain is disposed wear, the speeds of the pairs of rolls become different, leading to roll marks on the drawn glass sheet which impair the surface finish of the glass.

The present invention relates to an improved means for driving the movable rolls from the fixed rolls and has for one of its objects the provision of a relatively simple means for accomplishing this result without lost motion in the drive, so that each movable roll is driven uniformly and at the same speed as the opposing fixed roll regardless of its position relative to the glass.

A further object of the invention is the provision of improved means for positively driving the movable rolls from the respective fixed rolls in each pair and at the same speed as the opposing fixed roll.

These and other objects and features of the invention will become apparent from the following description when taken with the accompanying drawings, in which.

Figure 1:
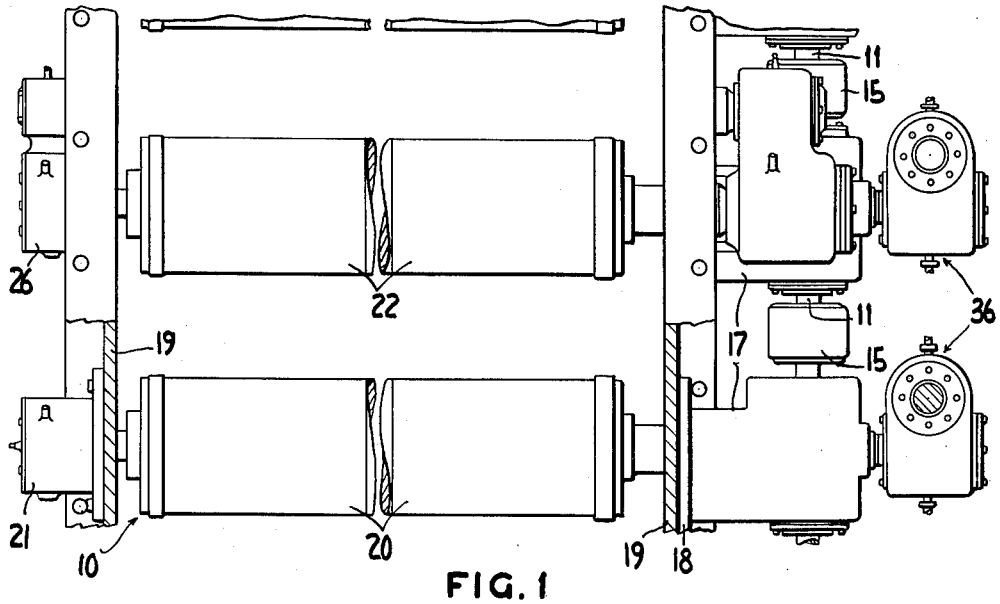
Figure 1 is a partial view of the drawing machine of this invention taken on line 1—1 of Figure 3 and showing to advantage a fixed and a movable roll.

In practicing the invention, a glass drawing apparatus, generally identified by the reference character 10, in which sheet glass is adapted to be drawn upwardly from a molten bath is provided, in a conventional manner, with a rigid support to which a motor is attached, the support and the motor not being illustrated in the present application. The motor operates a vertical sectional shaft 11 by driving a stud shaft 12 by means of V-belts and pulleys, such as the pulley 13 connected to the shaft 12, through conventional gearing connected to the vertical shaft 11 and the stud shaft 12 and housed in a gear box 14 (see Figure 4). The sectional shaft 11 is coupled along its length by means of spaced couplings 15, each of which is aligned with adjacent shaft sections by means of split keys or the like fitting into keyways 16 (see Figure 5) formed in the shaft and keyways (not illustrated) formed in the couplings.

Figure 2:
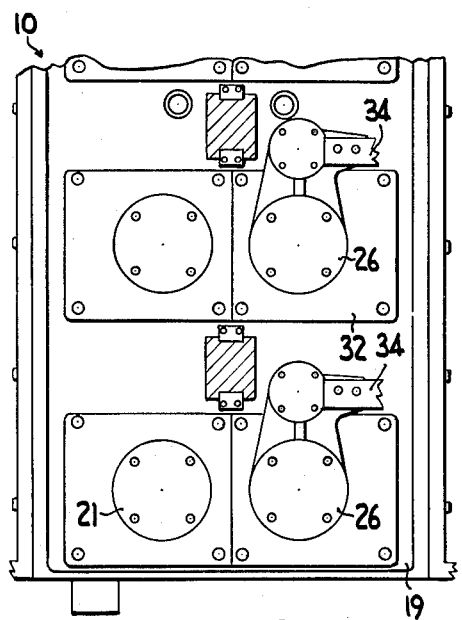
Figure 2 is a partial side view of the drawing machine of this invention looking from the left hand side of Figure 1.
Figure 3:
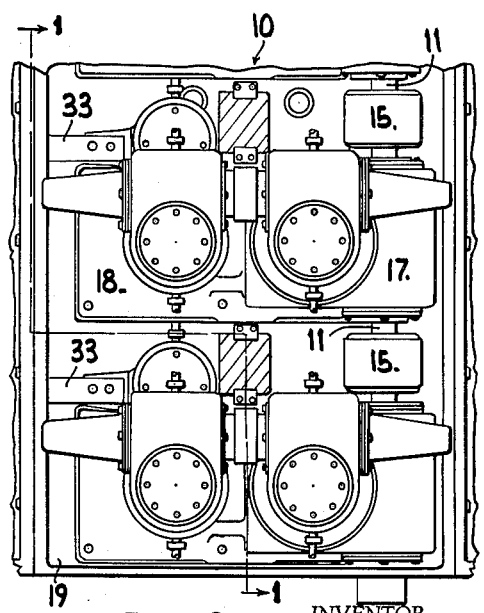
Figure 3 is a partial side view of the drawing machine of this invention looking from the right hand side of Figure 1.

Suitable bearings (not illustrated) are provided for rotatably receiving the shafts 11 and 12 and to support these shafts in their desired positions. The bearings for the shafts 11 are carried within castings 17, each having a plate portion 18 rigidly secured to the machine structure 19. The gear housing 14, previously mentioned, forms a part of one of the castings 17 and carries the bearings for the shaft 12. Each casting 17 also carries bearings (not illustrated) for rotatably supporting one end of a shaft or shaft extension of a fixed roll 20 of a pair of rolls, while the opposite end of the shaft of each roll 20 is rotatably supported in bearings (not illustrated) carried by a bearing jacket 21 rigidly attached to the other side of the machine structure 19, as illustrated in Figure 2.

Each casting 17 encloses reduction gearing of conventional design (not illustrated) to provide a driving connection between the shaft 11 and the associated fixed roll 20 at a reduced speed.

The other roll 22 of each pair of rolls is a swing or movable roll and its shaft is suitably supported for rotation in bearings at each end. One end of the shaft or shaft extension of each roll 22 is supported in spaced bearings 23 and 24 carried by a housing 25, and the opposite end of the shaft of each roll 22 is supported in bearings (not illustrated) carried by a bearing jacket 26.

Figure 6:
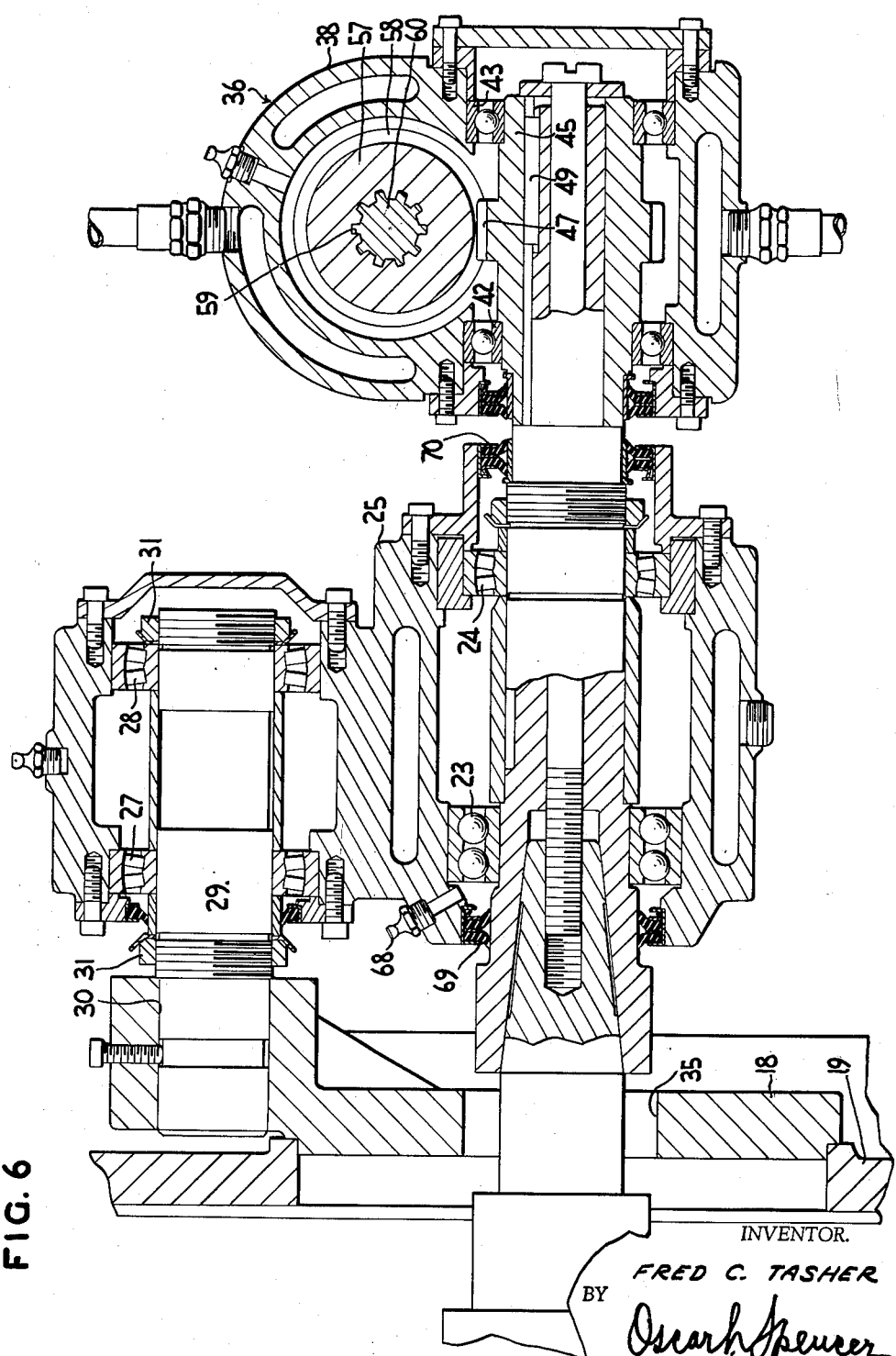
Figure 6 is a sectional view taken on line 6—6 of Figure 4.

To allow for the arcuate motion of the axis of each swing roll 22, the supporting bearings and the housing or jacket carrying the bearings are arranged for arcuate movement by being pivoted about an axis located above the axis of the roll. At one end of each roll 22 the housing 25 is provided with spaced bearings 27 and 28 to receive a stud shaft 29 fixed within a bore 30 formed in the plate portion 18 of the casting 17, the manner of fixing the stud shaft 29 within the bore being illustrated in Figure 6 of the drawings. Lock collars 31 fixedly retain the housing 25 and the stud shaft 29 in their predetermined relative positions, as illustrated in Figure 6 and the bearings 27 and 28 allow the housing 25 to rotate about the stud shaft 29. The other end of each roll 22 is similarly supported by a stud shaft (not illustrated) received within a suitable bore (also not illustrated) in a plate 32 attached to the machine structure 19 as illustrated in Figure 2. Adjacent the stud shaft 29, the housing 25 has an elongated weighted arm or lever 33 attached thereto, and a similar weighted arm or lever 34 is attached at the opposite end of the roll, as illustrated in Figure 2, the weighted arms or levers 33 and 34 providing a rotary force providing yielding pressure between a pair of rolls, namely a fixed roll 20 and a movable or swing roll 22 permitting the drawing of sheets of glass of varying thicknesses. The plate portion 18 of the casting 17 is provided with an arcuate slot 35 through which one shaft end of the roll 22 passes, and the plate 32 is similarly provided with an arcuate slot (not illustrated) for the passage of the other shaft end of each roll 22, the slots allowing the free swinging motion of the rolls 22 between certain limits fixed by the length of the slots.

Figure 4:
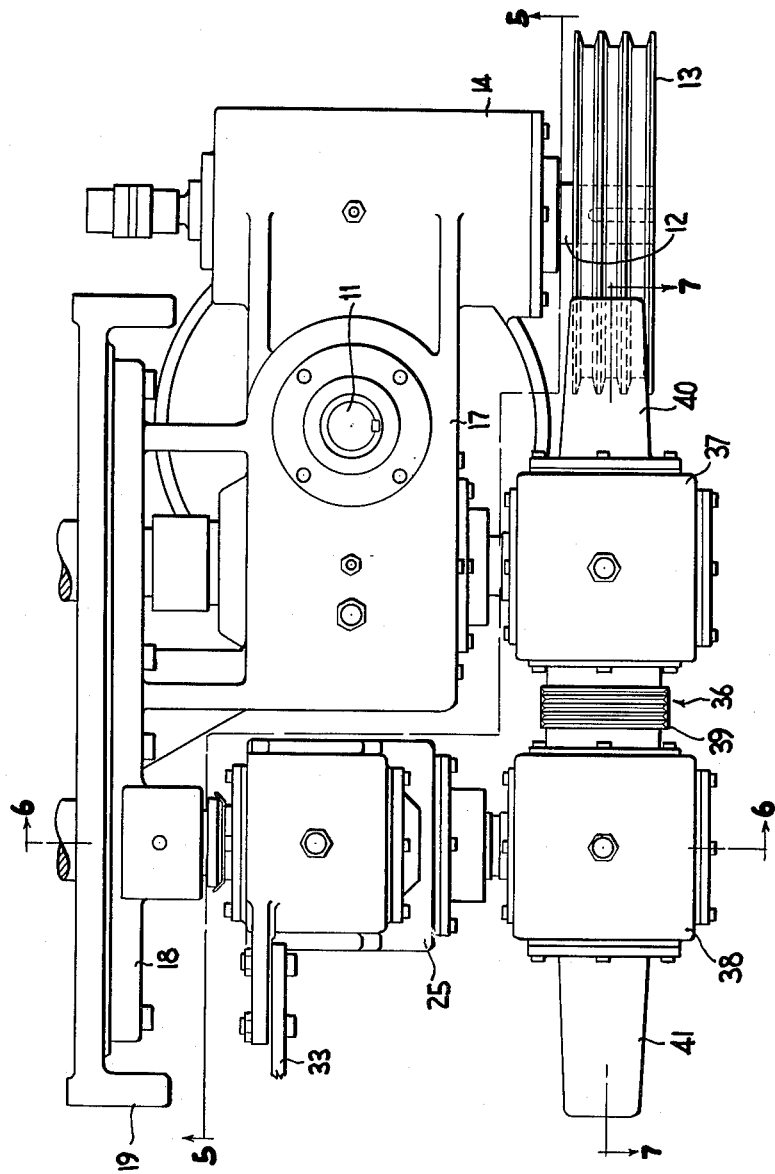
Figure 4 is an enlarged partial plan view of the drive means of the fixed and movable rolls and further illustrating the structure by which the rolls are driven from a source of power.
Figure 5:
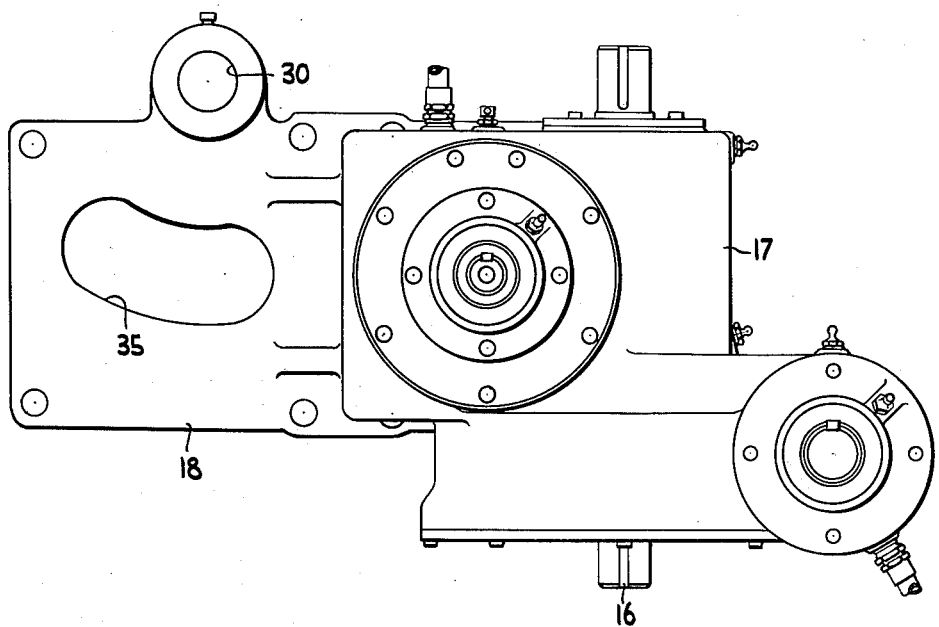
Figure 5 is a view taken on line 5—5 of Figure 4.
Figure 7:
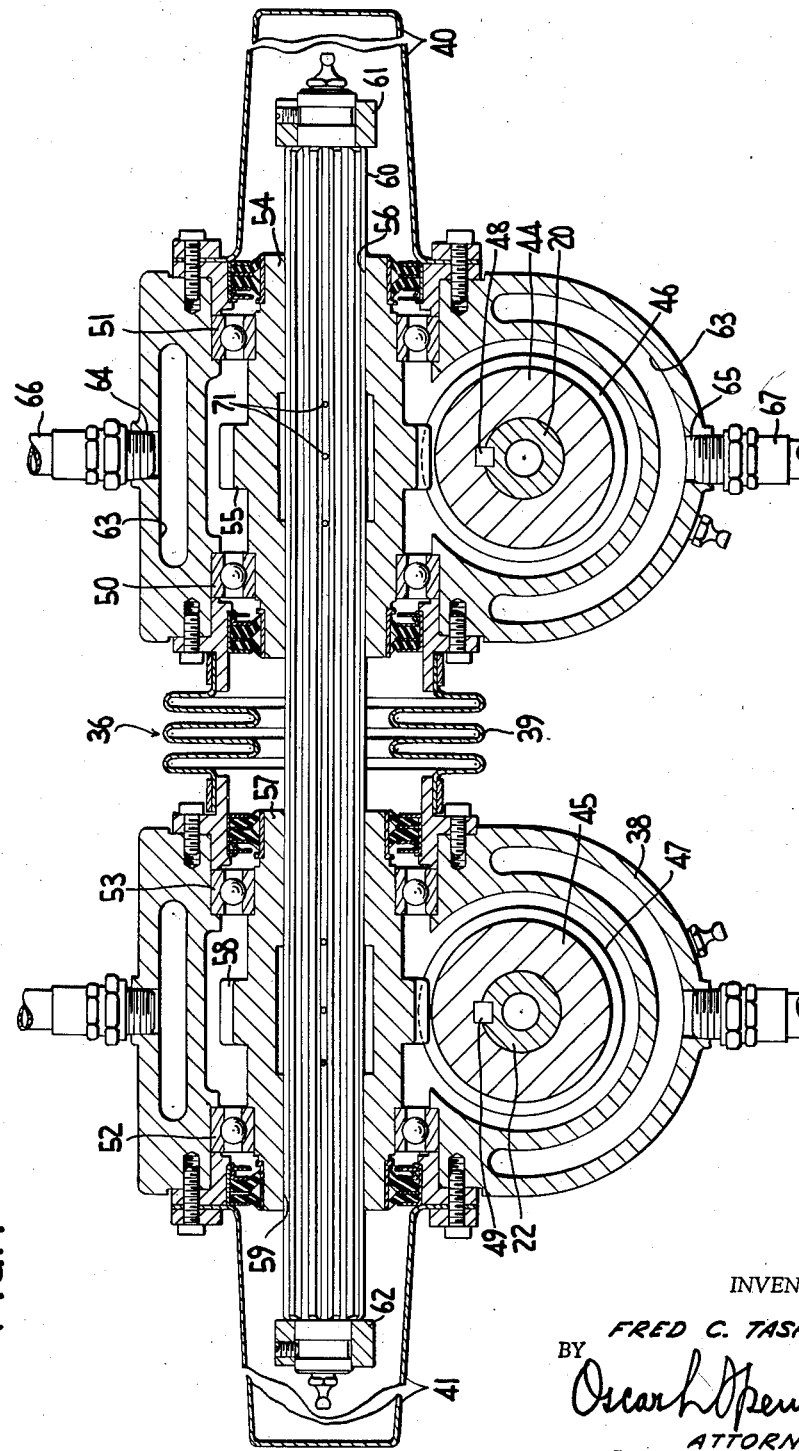
Figure 7 is a sectional view taken on line 7—7 of Figure 4.

To provide the same speed of rotation between each pair of rolls 20 and 22, a means, generally identified by the reference character 36 and illustrated in Figures 4, 6 and 7, to which attention is now directed, is provided for each of the pairs of rolls. Each of the means 36 comprises a pair of spaced housings 37 and 38 having a bellows 39 connected to the adjacent housing ends and thereby disposed between the housings, and cup-like members 40 and 41 attached to the respective free ends of each of the housings 37 and 38. The bellows and cup-like members are provided for preventing the entrance of foreign material, such as dirt, dust and chips of glass resulting from glass breaking in the drawing machine, especially at the beginning of the drawing operation, into the housings 37 and 38.

The housings 37 and 38 are each provided with a pair of spaced bearings, such as bearings 42 and 43 in the housing 38, as shown in Figure 6, to rotatably receive a sleeve 44 and 45, respectively. Each sleeve 44 and 45 has a helical gear 46 and 47, respectively, fixed thereto or formed integral therewith. The shaft or shaft extension of a roll 20 is received within its respective sleeve 44 and is keyed thereto for concurrent rotation by means of a key 48 received within suitable keyways formed in the shaft or shaft extension and in the sleeve. In a similar manner, the shaft or shaft extension of a roll 22 is received within its respective sleeve 45 and is keyed thereto by means of a key 49 received within suitable keyways formed in the shaft or shaft extension of the roll and in the sleeve.

Each housing 37 is also provided with spaced bearings 50 and 51 disposed on an axis normal to the bearings receiving the sleeve 44, and in a similar manner, each housing 38 is provided with spaced bearings 52 and 53 also disposed on an axis normal to the bearings 42 and 43 receiving the sleeve 45. The bearings 50 and 51 rotatably receive a sleeve 54 having a helical gear 55 fixed thereto or made integral therewith and the sleeve 54 is constructed with internal splines 56 along its inner diameter. The bearings 52 and 53 rotatably receive a sleeve 57 having a helical gear 58 fixed thereto or made integral therewith and the sleeve 57 is also constructed with internal splines 59 along its inner diameter. The gear 55 meshes with the gear 46 on the sleeve 44 connected to the fixed roll 20, and the gear 58 meshes with the gear 47 on the sleeve 45 connected to the movable or swing roll 22.

An externally splined shaft 60 is slidably received within the internally splined sleeves 54 and 57 and is provided with stop collars 61 and 62 affixed thereto at its terminal ends. As will be obvious, the shaft 60 provides a driving connection between a fixed roll 20, which is driven from the previously described motor and vertical shaft 11, and a movable or swing roll 22, and is free to slide between the limits fixed by the stop collars 61 and 62.

Because the subject device is subjected in its operation to elevated temperatures, provision has been made to cool the various parts by providing for the circulation of cooling fluid therethrough. For example, the housing 37 is provided with a fluid circulating chamber 63 and threaded communicating bores 64 and 65 for receiving suitable threaded fittings connected to flexible conduits 66 and 67 for the inlet and outlet of a cooling fluid such as water. In a similar manner, requiring no detailed description, the other housings, as obvious from the drawings, are also provided with the fluid circulating chambers and means in the form of flexible conduits for the inlet and outlet of the cooling fluid.

To reduce the friction between moving or movable parts of the subject device, means are provided for introducing a lubricating medium, such as oil or grease, and maintaining this lubricant about the various parts. For example, to lubricate the bearings 23 and 24 carried by the housing 25 (see Figure 6) a lubricant inlet 68 is provided which communicates with the interior of the housing 25 for the introduction of the lubricant to these bearings, and the housing is provided with grease seals 69 and 70 surrounding the portion of the roll 22 received within the bearings 23 and 24 for retaining the lubricant at the desired location. As will be obvious and requiring no further description, the other movable or moving parts are constructed with similar means for introducing lubricant and retaining the lubricant thereabout. In addition, the splined shaft 60 is provided with spaced oil holes 71 for the flow of lubricant along its length to reduce the sliding friction between it and the sleeves 54 and 57.

In operation of the device disclosed, molten glass in the form of a vertically moving ribbon is drawn from a bath of molten metal and is directed between the pairs of rolls which continually draw the ribbon upwardly to a capping station where the ribbon is cut into relatively large sheets. The ribbon of the initial draw varies considerably in thickness, but after an interval of time during which proper conditions are established within the drawing kiln, the ribbon is substantially uniform in thickness. The swing roll 22 of each pair accommodates the varying thicknesses of glass during the initial draw and also accommodates any variance in thickness as the draw continues. At all times, each pair of rolls rotates at the same speed, so as to maintain the drawing speed uniform and also to prevent roll marks on the surface of the ribbon which would occur if the rolls of each pair rotated at different speeds.

Assuming that glass of varying thickness is being drawn, each swing roll 22 will accommodate the glass by pivoting about an associated stud shaft 29 and the means 36 provides a uniform driving ratio of 1 to 1 between a shaft roll 20 and a swing roll 22 constituting a pair of rolls regardless of the relative positions of the pair of rolls to one another. Referring specifically to Figures 6 and 7, when a swing roll 22 pivots about a stud shaft 29, the associated housing 38 wherein the meshing gears 47 and 58 are disposed also pivots about the shaft 29 and assumes an angular position instead of the illustrated vertically disposed position. The splined shaft 60 because of the engagement of its splines with the splines 59 of the sleeve 57 also pivots from the horizontal position illustrated. The pivoting of the shaft 60, in turn, causes the housing 37 associated with a fixed roll 20 to pivot about the axis of the fixed roll and to assume an angular position instead of the vertical position illustrated. The pivoting of the housing 37 is allowed by the bearings in which the sleeve 44 is supported and the gear 55 will walk a short distance on the gear 46. The length of the shaft 60 and the flexibility of the bellows 39 allow the housings 37 and 38 to be spaced a greater distance apart in their angular positions relative to a vertical plane than in their normal positions illustrated in Figure 7. When the ribbon of glass becomes substantially uniform in thickness, the housings 37 and 38 will assume their relative positions illustrated in Figure 7 and the swing rolls 22 will be urged into engagement with the glass ribbon by means of the weighted levers or arms 33 and 34 as previously described. If a slight variation in the thickness of the glass occurs at various times during the draw, the pairs of rolls will accommodate this in the manner as described with reference to the initial draw, it being obvious from the structure that the rotational speeds of each pair of rolls are the same for all operating conditions.

From the foregoing it can be appreciated that the structure described obviates the deficiencies of the prior art structures wherein the pairs of rolls, while initially driven at the same speed eventually are driven at different speeds due to the wearing of sprockets or pinions over which chains are entrained.

While this invention has been described with particular reference to one embodiment, it will be apparent that the scope of the invention is only limited by the appended claims which should be construed as broadly as the prior art will permit.

I claim:

1. In an apparatus for drawing sheet glass from a molten bath substantially along a predetermined vertical plane and including an upright supporting structure, a series of pairs of drawing rolls normally arranged successively in substantial alignment, at least one pair of rolls including a normally stationary roll and a movable roll each rotatably supported by a shaft, means for supporting the shaft of said movable roll for arcuate movement to and from said stationary roll, means for connecting said stationary roll and said movable roll for rotation at the same speed regardless of their relative positions and allowing a change in spacing of said pair of rolls while both are being rotated, said last-named means including a gear mounted on one end of each shaft of said rolls, a pair of gears, each one of said pair meshing with one of the gears on the end of said shafts, and a rotatable shaft upon which said pair of gears is axially slidable and to which said pair of gears is drivingly connected for concurrent rotation, said rotatable shaft being of sufficient length to allow sliding of said pair of gears during said change in spacing of said pair of rolls, and means to rotatably drive one roll of each pair.

2. In an apparatus for drawing sheet glass from a molten bath substantially along a predetermined vertical plane and including an upright supporting structure, a series of pairs of drawing rolls normally arranged successively in substantial alignment, at least one pair of rolls including a normally stationary roll and a movable roll each rotatably supported by a shaft, means for supporting the shaft of said movable roll for arcuate movement to and from said stationary roll and means for connecting said stationary roll and said movable roll for rotation at the same speed regardless of their relative positions and allowing a change in spacing of said pair of rolls while both are being rotated, said last-named means including a pair of internally splined gears having a common axis, a gear connected to the shaft of each roll of said pair and each meshing with one of said pair of gears, an externally splined shaft having its axis coinciding with said common axis and extending through said internally splined pair of gears to connect said pair of gears for concurrent rotation, said shaft having a length in excess of the initial spacing of said pair of gears to allow said change in spacing of said pair of rolls and also a change in spacing between said pair of gears along said common axis, and means to rotatably drive one roll of each pair.

3. Apparatus for drawing sheet glass substantially vertically from a bath of molten glass comprising a plurality of pairs of rotatable drawing rolls normally arranged successively in substantial alignment, means for mounting one roll of each pair for rotation about a fixed axis and means for mounting the other roll of each pair for rotation about an axis movable in an arcuate path to and from said one roll in response to varying thicknesses of glass or the like encountered during the drawing operation, means to rotatably drive each roll mounted about a fixed axis, and means operatively associated with each pair of rolls to provide a substantially 1:1 drive therebetween, said last named means including a gear connected to each roll, a splined shaft, a pair of internally splined gears slidably received on said splined shaft for concurrent rotation, and means journaling each gear of said pair so that each meshes with a gear connected to a roll, said shaft allowing a change in spacing between said pair of gears slidably received thereon in response to changes in spacing between said rolls of each pair while continuing the drive therebetween.

References Cited in the file of this patent

UNITED STATES PATENTS

| | | |
|---|---|---|
| 671,175 | Appert | Apr. 2, 1901 |
| 1,818,207 | Drake | Aug. 11, 1931 |
| 1,838,305 | Genenger | Dec. 29, 1931 |
| 1,838,337 | Von Reis | Dec. 29, 1931 |
| 2,141,101 | Webster | Dec. 20, 1938 |
| 2,215,231 | Redshaw | Sept. 17, 1940 |
| 2,311,075 | O'Malley | Feb. 16, 1943 |